(12) United States Patent
Hicks et al.

(10) Patent No.: US 9,189,084 B2
(45) Date of Patent: Nov. 17, 2015

(54) STYLUS-BASED USER DATA STORAGE AND ACCESS

(71) Applicant: Barnes & Noble College Booksellers, LLC, Basking Ridge, NJ (US)

(72) Inventors: Kourtny M. Hicks, Sunnyvale, CA (US); Gerald B. Cueto, San Jose, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 226 days.

(21) Appl. No.: 13/793,408

(22) Filed: Mar. 11, 2013

(65) Prior Publication Data

US 2014/0253467 A1 Sep. 11, 2014

(51) Int. Cl.
*G06F 3/033* (2013.01)

(52) U.S. Cl.
CPC ....................................... *G06F 3/033* (2013.01)

(58) Field of Classification Search
CPC ........................................................ G06F 3/033
USPC ...................... 345/173–179; 178/18.01–20.04
See application file for complete search history.

(56) References Cited

U.S. PATENT DOCUMENTS

| | | | |
|---|---|---|---|
| 4,501,931 A * | 2/1985 | Ohya et al. | 345/175 |
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,806,869 B2 * | 10/2004 | Yamakado | 345/179 |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |

(Continued)

FOREIGN PATENT DOCUMENTS

EP 0722150 A1 7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Kumar Patel
*Assistant Examiner* — Vinh Lam
(74) *Attorney, Agent, or Firm* — Finch & Maloney PLLC

(57) ABSTRACT

A stylus-based data storage and access system is disclosed. In some example embodiments, a stylus configured as described herein includes storage for storing a user's access data, profile (e.g., device settings and preferences), and/or content and can wirelessly communicate with an electronic device that is paired therewith. Upon pairing, the user of the stylus can access his or her user data (stored locally on the stylus) and/or other data on the paired device or in the cloud. If desired, additional users having styluses of their own can use the same device in like fashion. Once a new user is logged into the device, any previous user can be logged out. A given user can utilize the user interface provided by the device to setup stylus-based access to the device by providing access information, which can be saved to the stylus. Subsequently, the user may review/alter that stylus-based information, as desired.

17 Claims, 7 Drawing Sheets

(56) References Cited

U.S. PATENT DOCUMENTS

| | | | |
|---|---|---|---|
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1* | 9/2001 | Jenkins et al. | 708/141 |
| 2002/0116421 A1 | 8/2002 | Fox et al. | |
| 2007/0047002 A1 | 3/2007 | Hull et al. | |
| 2008/0036747 A1 | 2/2008 | Hope | |
| 2009/0000831 A1* | 1/2009 | Miller et al. | 178/19.01 |
| 2009/0124320 A1* | 5/2009 | DeWaal | 463/16 |
| 2009/0181653 A1* | 7/2009 | Alharayeri | 455/414.1 |
| 2010/0035595 A1* | 2/2010 | Duggal et al. | 455/418 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0200513 A1* | 8/2012 | Kim et al. | 345/173 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0297306 A1* | 11/2012 | Hassan et al. | 715/735 |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0135262 A1* | 5/2013 | Alameh et al. | 345/179 |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0181953 A1* | 7/2013 | Hinckley et al. | 345/179 |
| 2013/0185680 A1 | 7/2013 | Chaudhri et al. | |
| 2013/0194308 A1 | 8/2013 | Privault et al. | |
| 2013/0207939 A1* | 8/2013 | Kremin et al. | 345/179 |
| 2014/0047498 A1* | 2/2014 | Malegaonkar et al. | 726/1 |
| 2014/0089914 A1* | 3/2014 | Kay et al. | 717/176 |
| 2014/0168176 A1* | 6/2014 | Nowatzyk et al. | 345/179 |
| 2014/0168177 A1* | 6/2014 | Mkrtchyan et al. | 345/179 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown—6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.

(56) References Cited

OTHER PUBLICATIONS engadget.com/2012/11/22/sony-haptic-feedback-stylus-patent/, 2 pages, printed from the Internet on Jun. 20, 2013.
"Stylus Hanging Bluetooth Headset," Brando—mobile.brando.com, http://mobile.brando.com/prod_detail.php? prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

\* cited by examiner

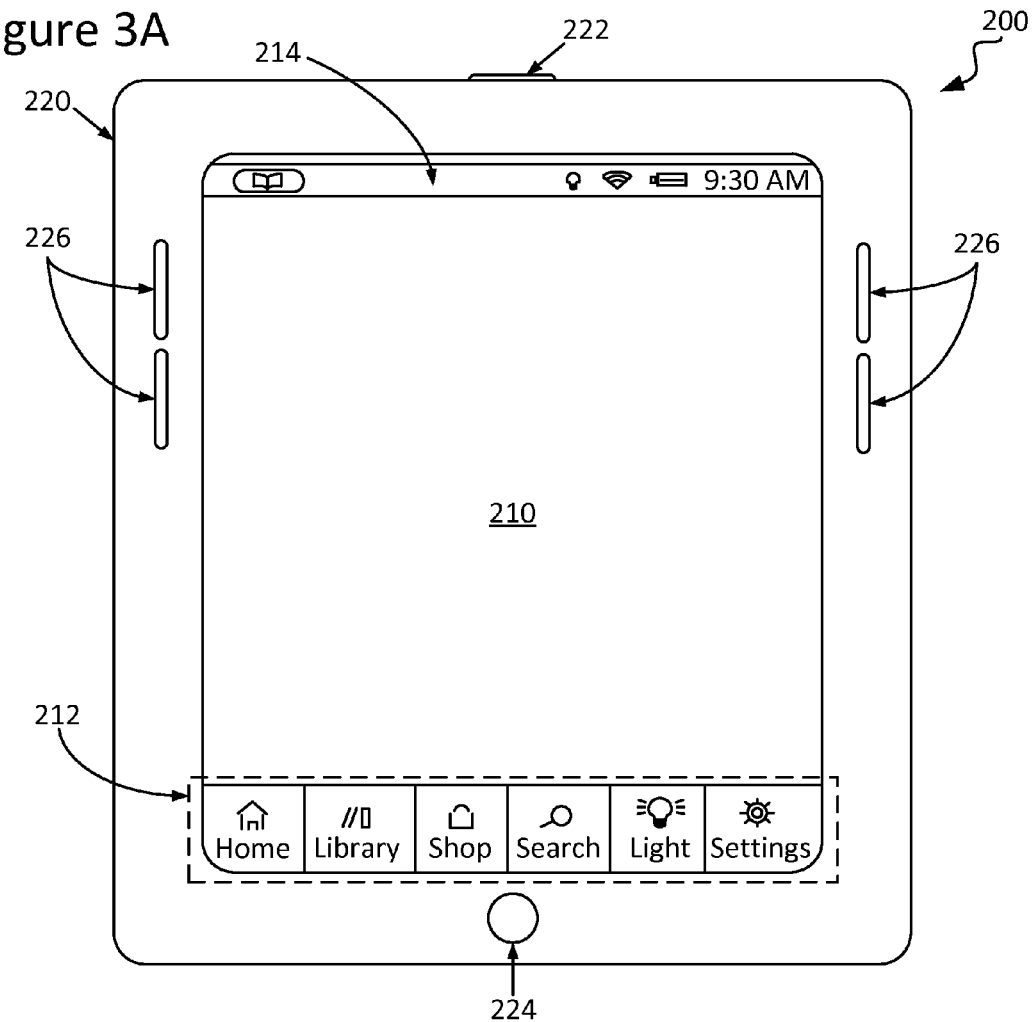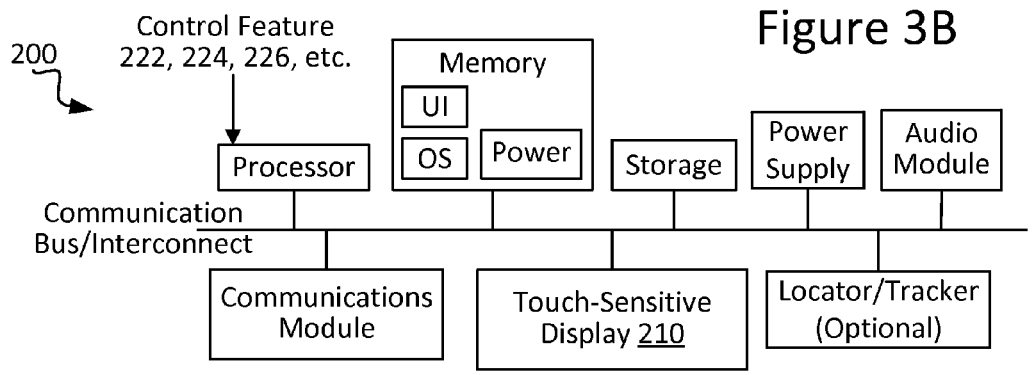

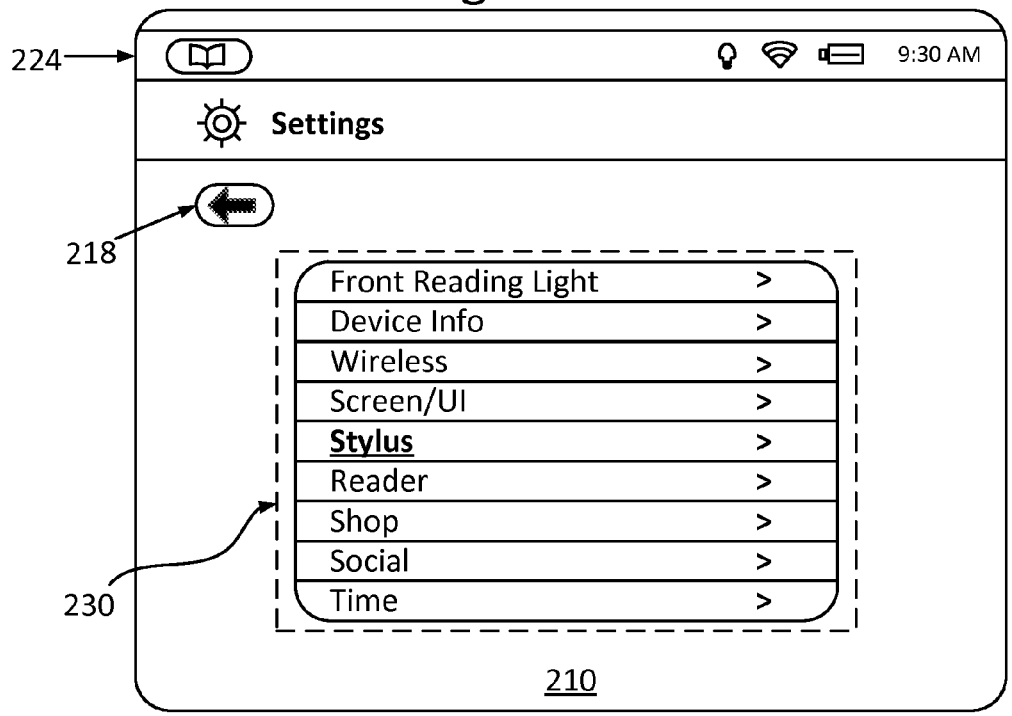
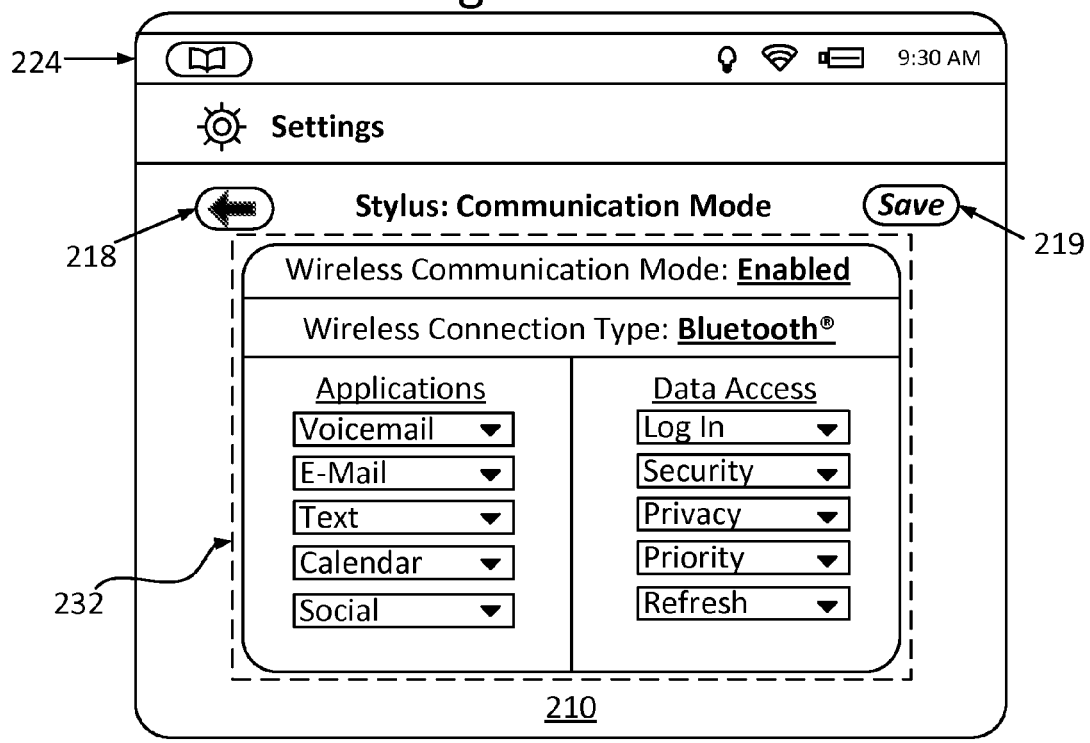

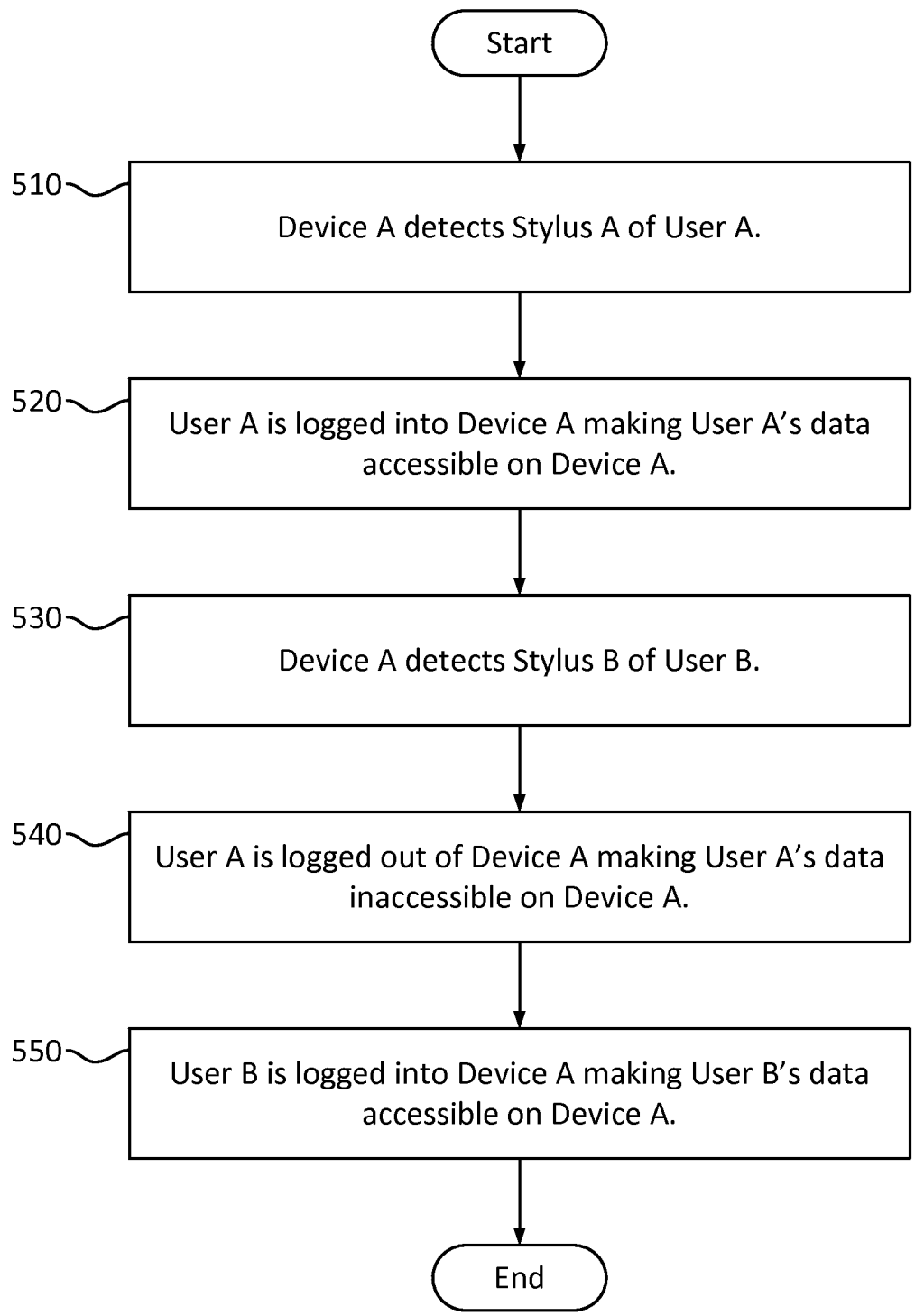

STYLUS-BASED USER DATA STORAGE AND ACCESS

FIELD OF THE DISCLOSURE

This disclosure relates to electronic computing devices and more particularly to a stylus-based data storage and access system for use with such devices.

BACKGROUND

Electronic display devices such as tablets, e-readers, mobile phones, smartphones, personal digital assistants (PDAs), and other such touchscreen electronic display devices are commonly used for displaying consumable content. The content may be, for example, an e-book, an online article or blog, images, documents, or a movie or video, just to name a few types. Such devices are also useful for displaying a user interface that allows a user to interact with the displayed content. The user interface may include, for example, one or more touchscreen controls and/or one or more displayed labels that correspond to nearby hardware buttons. The user may interact with the touch-sensitive device using fingers, a stylus, or other implement. The touchscreen display may be backlit or not and may be implemented, for instance, with a light emitting diode (LED) screen or an electrophoretic display. Such devices also may include other touch-sensitive surfaces, such as a track pad (e.g., a capacitive or resistive touch sensor) or a touch-sensitive housing (e.g., acoustic sensor).

BRIEF DESCRIPTION OF THE DRAWINGS

FIG. 3A is a front view of an example electronic device having a touch-sensitive display with which a stylus can interact, in accordance with an embodiment of the present invention.

FIG. 3B is a block diagram representing an example electronic device, in accordance with an embodiment of the present invention.

FIGS. 3C and 3D illustrate example configuration screen shots of the user interface (UI) of the electronic device shown in FIGS. 3A and 3B, configured in accordance with an embodiment of the present invention.

FIG. 5 is a flow diagram illustrating an example method of stylus-based auto-access to a computing device by multiple users, in accordance with an embodiment of the present invention.

DETAILED DESCRIPTION

Figure 1A:
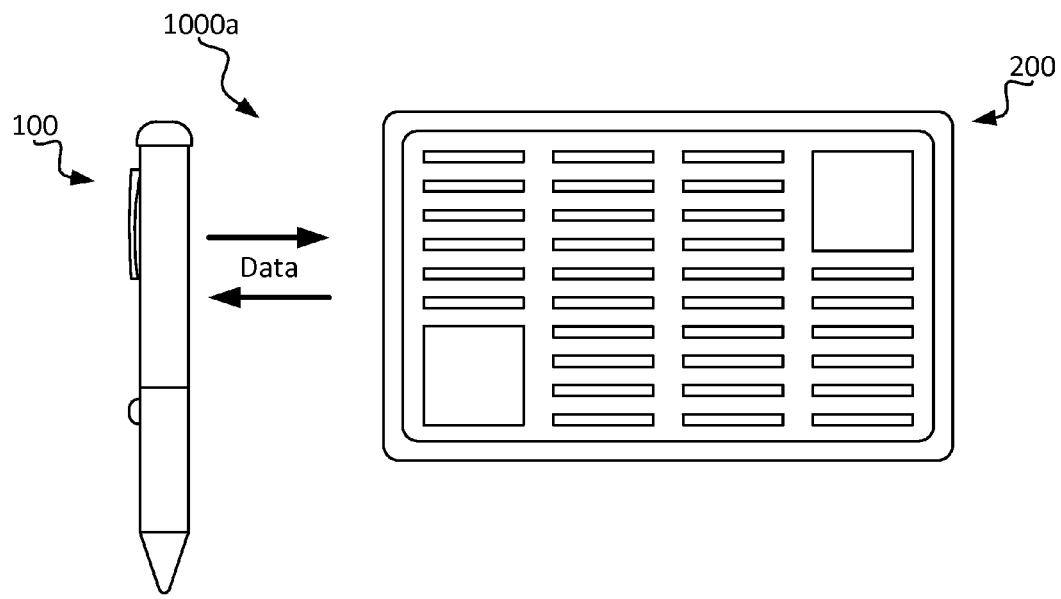
FIG. 1A illustrates a stylus-based communication system configured in accordance with an embodiment of the present invention.

A stylus-based data storage and access system is disclosed. In some embodiments, for example, a stylus configured as described herein includes storage for locally storing a user's access data. Access data generally refers to a user's login credentials or other such data that allows the user to access a device or cloud-based computing service where the user's content or work product is stored. In this sense, access data generally allows one user to be distinguished from other users, and in some specific cases allows the other users to be excluded from access to the user's content and work product. The stylus-based storage may also include a user profile that associates that particular user with preferred device settings and other pertinent data about user (e.g., user name and ID, preferences, launch-on-login applications, default applications, desktop or home screen configuration, etc). Thus, in one example embodiment, an auto-access mode as described herein activates on a target computing device in response to that device discovering a stylus having user access data stored therein is present. The auto-access mode is configured to obtain the user's access data from the stylus and using that access data to grant the access request. In some embodiments, the auto-access mode is further configured to obtain the user's profile data from the stylus and to configure the target computing device accordingly, so that it reflects the user's preferences, home page, and/or other such available profile data. As will be appreciated in light of this disclosure, the stylus can be configured to communicate with a stylus detection surface of the target computing device, and to wirelessly exchange data (e.g., access data, profile data) with the device. In some cases, the stylus-based storage may also include user content, depending on the size of the storage and the type of wireless communication link employed. In any such cases, upon pairing of the stylus with a given device, the stylus user can access her or his user data, which may be stored locally on the stylus, on the paired device, and/or in a cloud-based storage (e.g., local network storage, Internet-based storage facility, or both). Additional users, each possessing an auto-access mode enabled stylus as described herein, can use the same device in like fashion, where any one user's stylus pairing with that device effectively configures the device for use by that user. Once a new user is logged into a given device, any previous user is logged out. If two or more styluses are present, a prompt can be displayed on the device requiring that one of the currently available styluses is selected for use in conjunction with auto-access mode executing on the target device, in some embodiments. In some instances, a given user can utilize the user interface (UI) of the device or a cloud-based service to setup stylus-based access to the device by providing access and any desired profile information, which can be saved to the paired stylus. Subsequently, the user may review and alter that stylus-based information, as desired. Numerous configurations and variations will be apparent in light of this disclosure.

General Overview

As previously explained, electronic display devices such as tablets, eReaders, and smartphones are commonly used for displaying user interfaces and consumable content. In many cases, such devices include a touch-sensitive user interface (UI), and the user may have a related stylus that can be used to interact with the device via that UI. In general, the stylus is an alternative implement to the user's finger when navigating on a given device, which may be preferred by some users in some contexts. Beyond such usages, benefits of a stylus are relatively limited.

Thus, and in accordance with an embodiment of the present invention, a stylus-based auto-access mode system is disclosed. In some embodiments, the stylus is configured with a wireless communication module and a memory configured to store user data, such as access data, user profile (e.g. device settings), and user content. The communication module allows for wireless communication with an electronic computing device so that access data (and other data, in some embodiments) can be exchanged between the stylus and device. In one such embodiment, upon pairing of the stylus with a given computing device, a stylus-based access mode can be engaged that automatically causes the device to obtain the access information from the given stylus, so that the stylus owner can use that device. The access mode may further be configured to automatically configure the device according to the user's profile (e.g., device settings such as default view and applications), which may also be stored on the stylus along with the user's access information. The computing device may be, for example, a tablet, an eReader, a mobile phone, a laptop, a desktop, or any other mobile or non-mobile device that can be paired with the stylus.

In any case, and in accordance with an embodiment, a given electronic computing device and stylus configured as described herein can permit a user to access his or her user data on the computing device independently of whether or not such device is the user's own or otherwise default device. For example, when a User A uses his Stylus A on his Device A, he is logged into Device A and can access his user data with Device A, wherein that data to be accessed may be local to the device, stored on the stylus, or stored in a cloud-based repository (wherein Device A is effectively a portal to the cloud). If User B then uses her Stylus B with Device A. User A can be logged out of Device A and User B logged into Device A, thereby allowing User B to access her user data with User A's Device A. Thus, and in accordance with an embodiment, any number of users, each independently having a stylus configured as described herein, can make use of a single electronic computing device to access his or her individual user data securely and/or privately (e.g., to the exclusion of other users of the same device). The disclosed techniques may be employed in a number of ways as will be appreciated in light of this disclosure, so long as the stylus and a given device can communicatively couple and engage a stylus-based auto-access mode as described herein.

In general, a stylus as described herein may be any pen-like implement configured to interact with a stylus-sensitive surface of an electronic device, either by direct contact on that surface or by proximate contact with that surface, wherein the contact is sensed by the electronic device and converted into an electrical signal that can be processed thereby. In some cases, a stylus provided using the disclosed techniques can be configured, for example, as: (1) a partially/completely assembled computing stylus or digital pen unit; and/or (2) a kit or other collection of discrete components (e.g., stylus structure and/or supporting circuitry/componentry) which may be operatively coupled as desired.

System Architecture

Figure 1B:
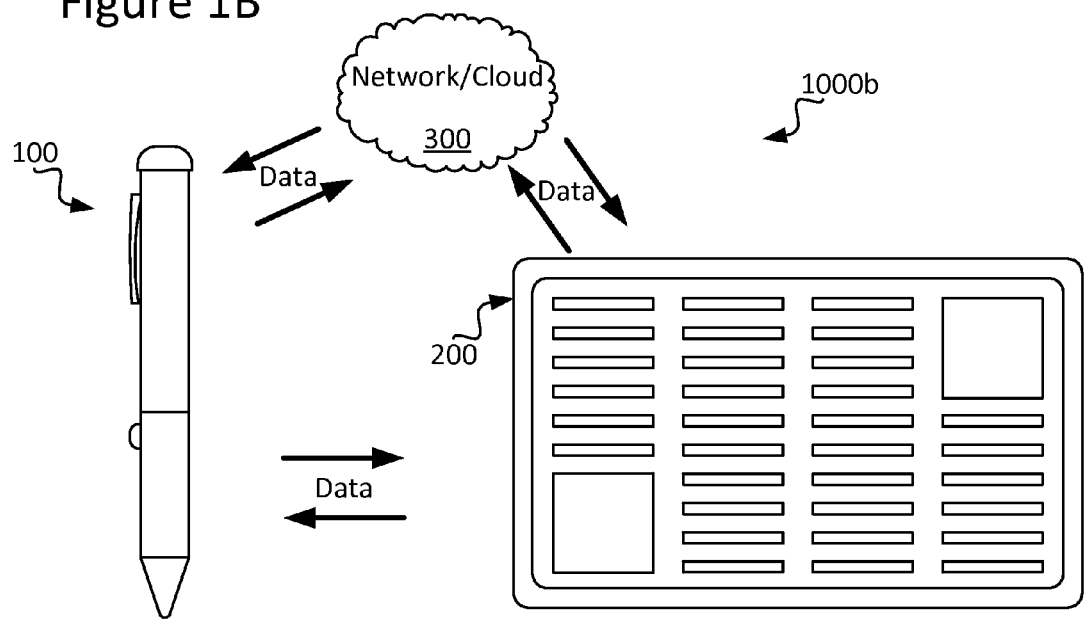
FIG. 1B illustrates a stylus-based communication system configured in accordance with another embodiment of the present invention.

FIG. 1A illustrates a stylus-based communication system 1000a configured in accordance with an embodiment of the present invention, and FIG. 1B illustrates a stylus-based communication system 1000b configured in accordance with another embodiment of the present invention. As can be seen from these figures, system 1000a/1000b (generally referred to as system 1000 hereinafter, unless specifically referring to one system or the other) includes a stylus 100 and an electronic device 200 which are communicatively coupled with one another. In some instances, stylus 100 can be directly communicatively coupled with device 200 (e.g., as is generally depicted by FIG. 1A). In some such instances, this direct communication with a paired device 200 can provide the user with access, for example, to a network/cloud 300 (e.g., as can be seen in FIG. 1B), wherein the device 200 is effectively used by the user as a portal to cloud-based resources. In some other cases, stylus 100 and device 200 can be indirectly communicatively coupled with one another, for example, by an intervening or otherwise intermediate network/cloud 300 for facilitating the transfer of data between stylus 100 and device 200 (e.g., as can further be seen in FIG. 1B). Numerous communication scenarios can be used, as will be appreciated in light of this disclosure.

Device 200 can be, for example, a tablet, an eReader, a mobile phone, a laptop, a desktop, or any other mobile or non-mobile computing device that can be paired with stylus 100. Stylus 100 is capable providing user input to device 200 in a normal stylus fashion. In addition, and in accordance with one or more embodiments, stylus 100 is capable of delivering data to and/or receiving data from device 200. In some cases, stylus 100 is capable of authorizing device 200 to deliver data to and/or receive data from cloud 300. Further details with respect to stylus 100 and device 200 will be provided below, in turn, with reference to FIGS. 2A-2B and 3A-3B.

Network/cloud 300 can be, for example, any suitable communications network. For instance, network/cloud 300 may be a public and/or private network, such as a private local area network (LAN) operatively coupled to a wide area network (WAN) such as the Internet. In some embodiments, network 300 may include one or more cellular networks. As previously noted, and in accordance with some embodiments, system 1000 can be configured for two-way communication between stylus 100 and device 200 and/or cloud 300. In some cases, network/cloud 300 may include supporting infrastructure and/or functionalities, such as a server and a service provider, but such features are not necessary to carry out communication via network 300.

Figure 2A:
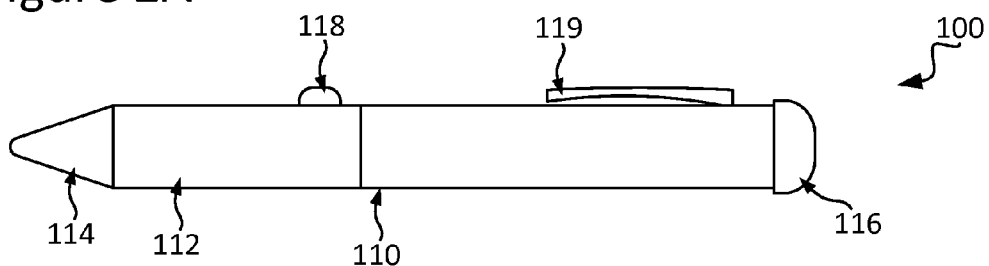
FIG. 2A illustrates a stylus configured in accordance with an embodiment of the present invention.

FIG. 2A illustrates a stylus 100 configured in accordance with an embodiment of the present invention. As can be seen, stylus 100 generally includes a pen-like body/barrel portion 110, a grip portion 112, a tip portion 114, and an optional end portion 116. As will be apparent in light of this disclosure, and in accordance with one or more embodiments, the body/barrel portion 110, grip portion 112, tip portion 114, and end portion 116 (when included) of stylus 100 can be provided with any desired configuration suitable for a given target application or end-use. Also, stylus 100 may include or otherwise be constructed, in part or in whole, from any material(s) which provide stylus 100, for example, with sufficient structural resilience, electrical conductivity (if desired), and user comfort, as will be further apparent in light of this disclosure. Furthermore, the dimensions (e.g., length, width/diameter, and weight) of stylus 100 may be customized, as desired. In any case, and in accordance with an embodiment, stylus 100 can be configured to interact with an electronic device 200 having a touch-sensitive surface that is sensitive to stylus-based user input. In some cases, such interaction may be by direct contact between stylus 100 and the touch-sensitive surface of device 200. In some cases, interaction may be by sufficiently proximate contact (e.g., hovering or otherwise close positioning of stylus 100, such as within a few centimeters of the touch-sensitive surface of device 200). To these ends, and in accordance with one or more embodiments, stylus 100 generally can be configured as a resistive stylus, a capacitive stylus, an active stylus, or other suitable configuration for interacting with a touch-sensitive device 200.

Figure 2B:
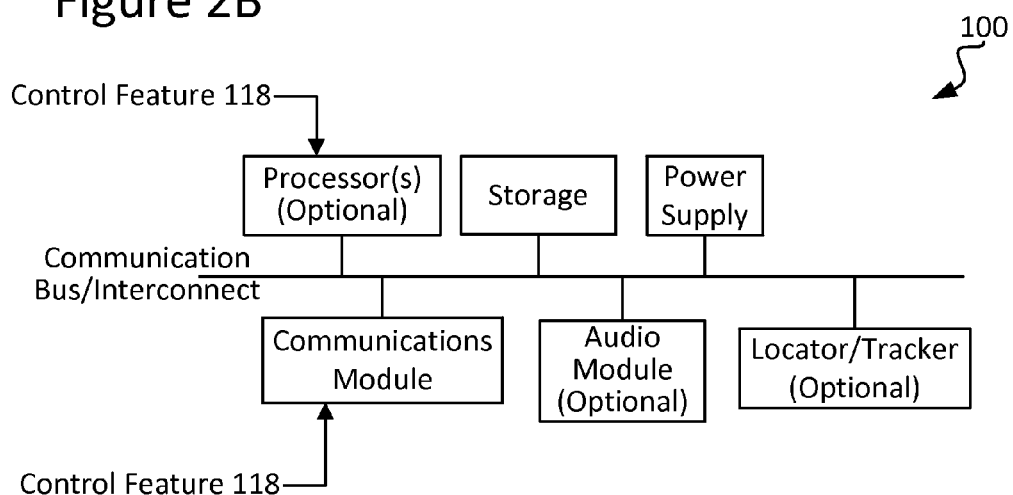
FIG. 2B is a block diagram representing an example stylus configured in accordance with an embodiment of the present invention.

FIG. 2B is a block diagram representing an example stylus 100 configured in accordance with an embodiment of the present invention. As can be seen, this example stylus 100 includes a processor, storage componentry, a communications module, a power supply, an audio module, and a locator/tracker module. A communications bus/interconnect is provided to allow for communication between the various components of stylus 100. As will be appreciated in light of this disclosure, other embodiments of stylus 100 may include fewer components (e.g., storage componentry and a communications module only), while still other embodiments may include other components not shown (e.g., a microphone; a speaker; a feedback module). Numerous configurations will be apparent in light of this disclosure.

In accordance with an embodiment, the one or more processors of stylus 100 (when included) can be configured, for example: to process data inbound from device 200, cloud 300, and/or from user input; to process data that is outbound from stylus 100; to execute applications/programs stored on stylus 100 or otherwise accessible via device 200 and/or cloud 300; to decode and render graphics (e.g., images and/or videos); and/or otherwise locally control functionality of stylus 100. In some cases, a given processor of stylus 100 can be configured to receive and interpret control signals from any control feature 118 of stylus 100. It should be noted, however, that a processor may be omitted altogether from stylus 100 in some embodiments (e.g., such as when the electronic device 200 with which stylus 100 is communicatively coupled provides sufficient control/direction). Other suitable configurations and capabilities of a given optional processor of stylus 100 will depend on a given application and will be apparent in light of this disclosure.

In accordance with an embodiment, the communications module of stylus 100 can be, for example, any suitable module which allows for connection of stylus 100 to electronic computing device 200 and/or cloud 300 so that information may be passed there between. Some example suitable wireless communication methods that can be implemented by the communications module of stylus 100 include: radio frequency (RF) communications, such as Wi-Fi®, Bluetooth®, and near field communication (NFC); IEEE 802.11 wireless local area network (WLAN) communications; infrared (IR) communications: cellular data service communications; satellite Internet access communications; custom/proprietary communication protocol; and/or any combination thereof. In some embodiments, stylus 100 can be capable of utilizing multiple methods of wireless communication. In some such cases, the multiple wireless communication techniques may be permitted to overlap in function and/or operation, while in some other cases they may be exclusive of one another. Numerous suitable configurations will be apparent in light of this disclosure.

Note that each of stylus 100 and device 200 can be associated with a unique identifier (UID), such as a media access control (MAC) address, a cell number, or other UID or access credentials, that can be used to assist communicative coupling of stylus 100 and device 200 directly and/or over a network 300 (e.g., when stylus 100 and device 200 are remote from one another or otherwise sufficiently far apart but still network-accessible). In a more general sense, the communications module of stylus 100 can be configured to execute any suitable protocol (e.g., LAN-based, Internet-based, cellular-based, satellite-based, or any combination thereof) which allows for: connection of stylus 100 with a paired device 200 such that data can be wirelessly communicated there between; and/or connection of stylus 100 with a network/cloud 300 such that data can be wireless communicated there between.

As will be appreciated in light of this disclosure, the suitability of a given wireless communication method may depend, at least in part, on the relative distance between stylus 100 and an associated device 200. Thus, it may be desirable, in some instances, to provide stylus 100 with the ability to switch the currently active wireless communication type, for example, as the relative distance between the stylus 100 and device 200 changes. For instance, if stylus 100 and associated electronic device 200 are sufficiently proximate one another (e.g., separated by a relatively small distance), then one or more appropriate close-range wireless communication techniques may be employed (e.g., Wi-Fi®, Bluetooth®, IR, etc.). If instead a relatively large distance separates the stylus 100 and associated device 200, then other longer-range communication techniques may be employed (e.g., cellular data service, satellite internet access, etc.). It should be noted, however, that wireless communication methods which otherwise might be reserved for long-range communication are not intended to be excluded from use when stylus 100 and device 200 are relatively proximate one another (e.g., cellular data service can be used when stylus 100 and device 200 are within a few feet of each other). Other suitable techniques for wireless communication between stylus 100 and an associated device 200 will depend on a given application and will be apparent in light of this disclosure.

As discussed above in the context of FIGS. 1A-1B, and in accordance with one or more embodiments, wireless communication may occur, for example: directly between stylus 100 and device 200 without an intervening network/cloud 300; indirectly between stylus 100 and device 200 through an intermediate network/cloud 300: directly between stylus 100 and network/cloud 300; and/or indirectly between stylus 100 and network/cloud 300 through an intermediate device 200. Also, as previously noted, the claimed invention is not limited only to wireless communication between stylus 100 and a paired device 200, as in some cases, a wired connection (e.g. USB, Ethernet, FireWire, or other suitable wired interface) may be provided there between. Numerous configurations will be apparent in light of this disclosure.

Returning now to FIG. 2B, stylus 100 includes on-board storage, in accordance with one or more embodiments. As previously noted, such storage componentry can be utilized, for example, to store user data, such as access data, user profile, and/or content. As previously discussed, a user's access data may include a UID or other access credentials, for example, for pairing stylus 100 with a device 200, for allowing stylus 100 to directly and/or indirectly access cloud 300, and/or for allowing device 200 to access cloud 300. In some cases, a given user's data may include information, for instance, pertaining to that user's social media, network, or other profile. In some cases, the user data that can be stored on stylus 100 may include preferences and other device settings which a paired device 200 may adopt (in part or in whole) to provide a desired user experience (e.g., via the UI provided by device 200, discussed below). Some examples of content which optionally may be stored on stylus 100 include media, programs, applications, and/or messages/notifications. Other user data which it may be desirable to store on stylus 100 will depend on a given application and will be apparent in light of this disclosure.

In any such case, and in accordance with one or more embodiments, user data may be stored on stylus 100 on a temporary or permanent basis, as desired. To that end, the storage of stylus 100 may include volatile and/or non-volatile memory. In some cases, the storage of stylus 100 may be expandable by any desired size or increment, for example, using a suitable storage expansion technology (e.g., a microSD card or other flash memory device). Other suitable configurations and capabilities of the storage module(s) of stylus 100 will depend on a given application and will be apparent in light of this disclosure.

In some embodiments, stylus 100 may include componentry which allows it to be powered, in part or in whole, by a standard or custom battery and/or integrated capacitive circuitry. When applicable, charging/recharging of the power source of stylus 100 may be provided using any suitable energy source, such as electrical energy, solar energy, and/or mechanical energy. Other suitable power supply componentry and related capabilities for stylus 100 will depend on a given application and will be apparent in light of this disclosure.

In some instances, it may be desirable to provide stylus 100 with locating/tracking capabilities. To that end, and in accordance with one or more embodiments, stylus 100 optionally may include locating/tracking componentry, such as a global positioning system (GPS) or other navigation system. In some cases, the locator/tracker of stylus 100 may aid a user in locating an associated device 200 relative to stylus 100 and/or vice versa. In some instances, the locator/tracker of stylus 100 may aid a user in finding and retrieving a stylus 100 or a device 200 that has been misplaced or stolen. Numerous configurations and capabilities will be apparent in light of this disclosure.

In some embodiments, stylus 100 optionally may include audio componentry, for example, to aid in recording and/or playback of audio data. To that end, in some cases, stylus 100 can include a speaker or other audio output device, for example, to play audio data stored locally on stylus 100 or received from a paired device 200 or network/cloud 300. In some cases, stylus 100 can include a microphone or other audio input device, for example, to record audio data from the user or other source near stylus 100 (e.g. which in turn may be stored locally on stylus 100 and/or transmitted to device 200 and, if applicable, network/cloud 300). Numerous configurations will be apparent in light of this disclosure.

In some cases, stylus 100 optionally may include one or more features designed to aid a user in use, manipulation, or operation thereof. For instance, in some embodiments, stylus 100 includes one or more physical control features 118 (e.g., buttons, switches, knobs, pressure sensors, toggles, sliders) which a user can manually manipulate to aid in controlling or otherwise operating stylus 100. In some cases, a given physical feature 118 can be used for providing a control signal to the related computing device 200, so as to alter or otherwise control the performance/behavior of the device 200. Thus, a user may be able to interact with or otherwise operate a related electronic computing device 200 using a feature 118 of stylus 100. When included, a given physical control feature 118 may be positioned anywhere along stylus 100 (e.g., on body/barrel portion 110, on grip portion 112, on tip portion 114, on end portion 116). Numerous configurations will be apparent in light of this disclosure.

In accordance with an embodiment, a given control feature 118 may be assigned to or otherwise associated with any of a wide range of functions and operations of stylus 100 and/or device 200, as desired for a given target application or end-use. For instance, a given control feature 118 can be configured to: to make a selection from one or more options displayed by the UI of device 200; to access or otherwise manage user data (e.g., access data, user profile data, and/or content) stored on stylus 100; to enable/disable stylus 100 and/or device 200; to initiate and/or terminate a communication connection between stylus 100 and device 200 and/or cloud 300; to perform a data sync or other refresh for stylus 100 and/or device 200; and/or to save or revert changed user data to stylus 100. Other suitable configurations and capabilities for a given control feature 118 of stylus 100 will depend on a given application and will be apparent in light of this disclosure.

Also, in some embodiments, stylus 100 optionally may be provided with one or more physical features (e.g., contours; tapered profile; indents; recesses; ribs; bumps), for example, to aid a user in gripping or otherwise manipulating it. When included, such features may be located anywhere along stylus 100 (e.g., on body/barrel portion 110, on grip portion 112, on tip portion 114) and, in some instances, may comprise a material (e.g., such as rubber, foam, or other suitable material) which generally is conducive to the user's grip/manipulation of stylus 100. Furthermore, in some embodiments, stylus 100 optionally may be provided with a clip or other fastener 119, for example, to aid in attaching stylus 100 to any desirable surface/structure, such as a pocket, a holder, and/or an associated device 200. In some instances, stylus 100 may be configured to be physically received and retained by (e.g., inserted into) an associated device 200. Numerous suitable configurations will be apparent in light of this disclosure.

As previously noted, stylus 100 can be configured to interact, for example, with an electronic device 200 having a touchscreen display or other touch-sensitive surface. FIG. 3A is a front view of an example electronic device 200 having a touch-sensitive display 210 with which a stylus 100 can interact, in accordance with an embodiment of the present invention. As can be seen from FIG. 3A, device 200 may be generally configured, in some embodiments, as an eReader device or a tablet (e.g., such as the NOOK® eReader and tablets by Barnes & Noble, Inc.). In the depicted example case, device 200 includes a touch-sensitive display 210 housed within or otherwise protected by a housing 220 and having one or more buttons or other control features 222, 224, 226, etc. It should be noted, however, that the claimed invention is not limited in form or function to an eReader device like that of FIG. 3A. Other suitable example devices 200 include: a laptop/notebook computer; a mobile phone; a smartphone; a personal digital assistant (PDA); a portable media player (PMP); a global positioning system (GPS) or other navigation system; a gaming console or handheld gaming device; a desktop computing system; a television; and an electronic visual display. In a more general sense, device 200 can be any portable/mobile or non-mobile electronic device including or otherwise configured as a touchscreen display or as a non-touch-sensitive display that can be used in conjunction with a touch-sensitive surface. Numerous suitable configurations will be apparent in light of this disclosure.

FIG. 3B is a block diagram representing an example electronic device 200, in accordance with an embodiment of the present invention. As can be seen, this example device 200 includes a processor, memory (e.g. RAM and/or ROM for processor workspace and storage), additional storage/memory (e.g., for any of the various types of user data discussed above), a communications module, a touch-sensitive display 210, a power supply, an audio module, and a locator/tracker module. A communications bus/interconnect is provided, for instance, to allow for communication between the various components of device 200. As will be appreciated in light of this disclosure, other embodiments of device 200 may include fewer components, while still other embodiments may include other components not shown (e.g., a microphone; a speaker; a co-processor; a feedback module).

The one or more processors of device 200 can be configured, for example, to process data that is: outbound for stylus 100; outbound for cloud 300; and/or inbound for device 200 from a paired stylus 100, a user, cloud 300, or any other suitable data source, as will be apparent in light of this disclosure. In some cases, the processor circuitry of device 200 may be configured to aid in processing electrical signals received from interaction with stylus 100 (e.g., direct contact and/or proximate contact). In some instances, one or more co-processors and/or controllers may be included to assist a given processor with controlling device 200. In some cases, a given processor of device 200 may be configured to receive and interpret signals from any of the various control features 222, 224, 226, etc., of device 200. As will be appreciated in light of this disclosure, any of a wide range of suitable processors can be implemented (e.g., such as the 800 MHz Texas Instruments OMAP3621 applications platform), as desired for a given target application or end-use. Other suitable configurations and capabilities of the processor(s) of device 200 will depend on a given application and will be apparent in light of this disclosure.

The memory of device 200 can be of any suitable type (e.g., RAM and/or ROM, or other suitable memory) and of any suitable size, and in some cases may be implemented with volatile memory, non-volatile memory, or a combination thereof. Other suitable configurations and capabilities of the memory of device 200 will depend on a given application and will be apparent in light of this disclosure.

In the example embodiment of FIG. 3B, the memory of device 200 includes a number of modules stored therein that can be accessed and executed by the processor (and/or a co-processor, if included). The shown modules include an operating system (OS), a user interface (UI), and a power conservation routine (Power). These and other modules can be implemented, for example, in any suitable programming language (e.g., C, C++, objective C, JavaScript, custom or proprietary instruction sets, etc.), and encoded on a machine-readable medium that, when executed by the processor (and/or co-processors), carries out the functionality of the device including a UI having stylus-based communication functions as described herein. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chipset or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

In some cases, device 200 can include an operating system (OS), for example, to aid in processing received electrical signals upon interaction (e.g., direct contact and/or proximate contact) with stylus 100. The OS module can be implemented with any suitable OS, mobile or otherwise (e.g., Android OS from Google. Inc.; iOS from Apple, Inc.; Windows Phone OS from Microsoft Corp.; etc.), as will be apparent in light of this disclosure.

Furthermore, in some cases, device 200 can include a power management (Power) module. As will be appreciated in light of this disclosure, such power module may be configured as typically done, in some cases. In some instances, the power module may aid in automatically transitioning device 200, for example, to a low-power consumption mode or sleep mode after a given period of non-use. Also, a wake-up from such sleep/low-power mode can be achieved, for example, by a physical button press, a touchscreen swipe, and/or other user action.

Furthermore, device 200 includes a user interface (UI) module configured, for example, to provide a UI based on touch-sensitive display 210, as discussed below. In addition, the UI can be programmed or otherwise configured to carry out a stylus-based auto-access mode as variously described herein, such as with reference to the screen shots and example use-cases of FIGS. 1A-1B, 3A, and 3C-3D, and/or the methodologies demonstrated in FIGS. 4A-4C, 5, and 6, which will be discussed in turn below.

In some embodiments, device 200 may include one or more storage modules. When included, such storage componentry may be utilized, for example: to store user data received from stylus 100 as previously discussed (e.g., a UID or other access credentials; user profile; saved content); and/or to store media, programs, applications, etc., received from cloud 300. In any such case, and in accordance with one or more embodiments, such data can be stored on device 200 on a temporary or permanent basis, as desired. To that end, the storage of device 200 may include volatile and/or non-volatile memory. In some cases, the storage of device 200 may be expandable by any desired size or increment, for example, using a suitable storage expansion technology (e.g., a microSD card or other flash memory device). Other suitable configurations and capabilities of the storage module(s) of device 200 will depend on a given application and will be apparent in light of this disclosure.

As previously noted, device 200 includes communications componentry to aid in communicatively coupling device 200 with stylus 100 (and cloud 300, in some cases). The communications module of device 200 can be configured, for example, to execute any suitable protocol which allows for connection of a stylus 100 with a paired device 200 such that data can be wirelessly communicated there between. In some instances, the communications module of device 200 also may be configured to provide wireless communication of data between device 200 and network/cloud 300. Thus, in some such instances, indirect wireless communication between stylus 100 and cloud 300 may be provided via device 200 (e.g. device 200 acts as a portal or other intermediate for stylus 100 to access cloud 300). Other suitable componentry (e.g., chips or chipsets) which provide device 200 with desired wireless communication capabilities (including any custom or proprietary protocols) will depend on a given application and will be apparent in light of this disclosure.

As will be appreciated in light of this disclosure, and in accordance with one or more embodiments, wireless communication between device 200, a paired stylus 100, and/or cloud 300 may be provided using any one or more of the various suitable wireless communication technique/methods discussed above with reference to stylus 100. As will be further appreciated, device 200 can be capable of utilizing multiple methods of wireless communication, in some instances with optional overlapping in function and/or operation, as desired for a given target application or end-use. As will be yet further appreciated, much like with stylus 100, the suitability of a given wireless communication technique may depend, at least in part, on the relative distance between stylus 100 and an associated device 200. Numerous suitable configurations will be apparent in light of this disclosure.

As previously noted, and in accordance with one or more embodiments, device 200 can include or otherwise be operatively coupled with one or more touch-sensitive displays 210. It should be noted, however, that the claimed invention is not so limited, as in some other embodiments, device 200 may include or otherwise be operatively coupled with a non-touch-sensitive display and have a touch-sensitive surface implemented therewith (e.g., a track pad; a touch-sensitive housing 220). In any such cases, device 200 generally may be capable of translating direct and/or proximate contact of touch-sensitive display 210 by stylus 100 into an electronic signal that can be manipulated or otherwise used to trigger a UI action, such as any of those discussed herein.

In accordance with an embodiment, stylus 100 can be capable of providing an input to a touch-sensitive device 200 by direct contact and/or by proximate contact with a given touch-sensitive surface thereof (e.g., a touchscreen display 210). To that end, touch-sensitive display 210 generally may be configured to detect/sense contact from stylus 100 at a given location of display 210. In some such embodiments, display 210 also may be configured to translate that contact into an electrical signal which can be processed by device 200. Device 200 may detect/sense contact of display 210 by stylus 100 using any of a wide variety of touch-sensing techniques, such as: capacitive touch-sensing; resistive touch-sensing; surface acoustic wave (SAW) touch-sensing; infrared (IR) touch-sensing; optical imaging touch-sensing; and/or any combination thereof. Other suitable techniques for detecting/sensing contact of display 210 (or other touch-sensitive surface of device 200) by stylus 100 will depend on a given application and will be apparent in light of this disclosure.

In some cases, device 200 may be configured to display or otherwise provide to the user a touch-sensitive user interface (UI) (e.g., on a touch-sensitive display 210). To that end, and in accordance with one or more embodiments, touchscreen display 210 may be configured to display various UI menus, sub-menus, features, and/or buttons which a user may utilize as UI touchscreen controls. As will be appreciated in light of this disclosure, such UI touchscreen controls can be programmed or otherwise configured using any suitable conventional and/or custom techniques, as desired for a given target application or end-use. In some instances, a given UI control can be assigned or otherwise associated with a given control feature/button 222, 224, 226, etc., of device 200. Other suitable configurations and capabilities of a given UI of device 200 will depend on a given application and will be apparent in light of this disclosure.

Touchscreen display 210 may be configured, in some cases, to display or otherwise provide the user with one or more taskbars 212. A given taskbar 212 may include, for instance, a quick navigation menu (e.g., such as is enclosed by the dashed box in FIG. 3A) which may provide the user with ready access to any of a number of features/capabilities of device 200. For example, in some embodiments, a taskbar 212 may provide a quick navigation menu which includes one or more touch-sensitive virtual buttons which, when activated by the user, cause device 200 to perform any of a wide variety of tasks or operations. For instance, in the example case depicted by FIG. 3A, taskbar 212 includes a Home button, a Library button, a Shop button, a Search button, a Light button, and a Settings button, each of which can be associated with a corresponding function or capability, as will be appreciated in light of this disclosure. The claimed invention is not so limited, however, as additional and/or different buttons and capabilities for a given quick navigation menu of taskbar 212 may be provided, as desired for a given target application or end-use.

In some cases, touchscreen display 210 may be configured to display or otherwise provide the user with one or more status bars 214 as part of the UI. A given status bar 214 may be configured to convey to the user, for example, information pertaining to the operation, status, and/or performance of device 200 and/or a paired stylus 100. In some cases, such information may be conveyed to the user by display of one or more icons which are indicative of or otherwise associated with any of a wide range of settings/functions of device 200 and/or stylus 100. For instance, in the example of FIG. 3A, status bar 214 includes a Nightlight icon which can indicate the current state of the nightlight function of display 210, a Wireless Network Signal icon which can indicate the state of the wireless connection of device 200 with stylus 100 and/or other wireless signal source, a Battery Life icon which can indicate the remaining power available for device 200 and/or stylus 100, a Clock icon which can indicate the current time, and a Book icon which can indicate whether a book (or other media file/stream) is currently active on device 200. The claimed invention is not so limited, however, and additional and/or different capabilities of device 200 and/or stylus 100 (and thus additional and/or different corresponding icons for a given status bar 214) will depend on a given application and will be apparent in light of this disclosure.

In some cases, such as the example embodiment depicted in FIG. 3A, touch-sensitive display 210 of device 200 can be housed within or otherwise protected by a housing 220. However, the claimed invention is not so limited, as other embodiments may omit a housing 220 altogether. When included, housing 220 can be provided with any desired geometry and dimensions, as desired for a given target application or end-use. Furthermore, housing 220 can be constructed from any suitable material(s), as will be apparent in light of this disclosure.

Also, device 200 can include one or more buttons or other control features 222, 224, 226, etc., in accordance with an embodiment. A given control feature 222, 224, 226, etc., may be provided, for example, as a physical or virtual button, switch, toggle, slide, or other suitable control, as will be apparent in light of this disclosure. Also, a user may activate a given control feature 222, 224, 226, etc., for example, by touching, pressing, and/or holding such button. In some instances, a given control feature 222, 224, 226, etc., can be configured such that different responses result when different methods/patterns of activating the control feature are used (e.g., pressing and releasing a button provides a first response, while pressing and holding that button provides a second, different response). In some example cases, a given control feature 222, 224, 226, etc., may be located on or otherwise integrated with housing 220. However, the claimed invention is not so limited, as in some other example cases, a given control feature 222, 224, 226, etc., may be presented or otherwise provided by display 210. In some cases, activation of a given control feature 222, 224, 226, etc., may cause a corresponding touch-based UI control feature to be displayed on display 210, for example, to confirm a given user input (e.g., to confirm a given action/request). Other suitable configurations, locations, and capabilities for a given control feature 222, 224, 226, etc., of device 200 will depend on a given application and will be apparent in light of this disclosure.

In general, and in accordance with an embodiment, a given control feature 222, 224, 226, etc., can be included to aid a user in controlling, operating, or otherwise utilizing device 200 and/or stylus 100. For instance, control feature 222 may be configured, for example, as a power button associated with changing the power state of device 200 (e.g. powering up and/or down; entering and/or leaving a sleep state). In some embodiments, control feature 224 may be configured, for example, as a home button associated with any of a number of functions and/or capabilities of device 200 (e.g., returning to a home screen; ceasing an active application/function currently being executed on device 200 and/or stylus 100; closing a menu/sub-menu that is currently open and displayed on display 210; enabling/disabling a power conservation routine for device 200 and/or stylus 100). In some embodiments, control feature(s) 226 may be configured, for example, as general-purpose buttons associated with any of a wide variety of functions and/or capabilities of device 200 (e.g., cycling through content displayed by display 210; paging forward and backward through displayed data and options). It should be noted, however, that the claimed invention is not so limited to these examples, and in a more general sense, a given control feature 222, 224, 226, etc., may be associated with any standard and/or user-defined function, capability, or application of device 200, as desired.

FIGS. 3C and 3D illustrate example configuration screen shots of the user interface (UI) of the electronic device shown in FIGS. 3A and 3B, configured in accordance with an embodiment of the present invention. As can be seen, a user may select from any of a number of options provided by settings menu 230, including an option directed to settings corresponding to stylus 100, for example, in response to selecting the stylus settings option provided by settings menu 230, display 210 may display a stylus settings sub-menu 232. As can be seen, and in accordance with this example embodiment, the user can configure a number of settings/functions with respect to stylus 100 and device 200, such as the wireless communication mode and type. As can further be seen from FIG. 3D, and in accordance with an embodiment, some available applications are provided along with corresponding drop-down menus, as well as data access settings with corresponding drop-down menus. In other embodiments, graphical user interface (GUI) elements such as check boxes and/or radio buttons additionally or alternatively may be implemented as part of the UI for options displayed in sub-menu 232. Numerous suitable configurations will be apparent in light of this disclosure.

As can further be seen from FIG. 3D, stylus settings sub-menu 232 may include a UI option which, when selected or otherwise activated by the user, enables/disables wireless communication between device 200 and stylus 100 and/or cloud 300. In other embodiments, the stylus communication mode may be always enabled or enabled, for example, by use of a control feature (e.g. button/switch) on stylus 100 and/or device 200. Also, stylus settings sub-menu 232 may include a UI option corresponding to the type of wireless connection between device 200 and a paired stylus 100 (e.g., Wi-Fi®, Bluetooth®, IR, etc.). Furthermore, in some embodiments, stylus settings sub-menu 232 may include one or more UI options which, when selected or otherwise activated by the user, specify log in preferences, security credentials, privacy settings, access priorities, and/or refresh settings. Any number of menu schemes and/or nested hierarchies of UI features and options may be provided, in accordance with such embodiments. Also, in other embodiments, the stylus notification mode can be hard-coded such that no configuration sub-menus are needed or otherwise provided (e.g. the user could be given an online help file or other literature to explain mode functionality). The degree of hard-coding versus user-configurability can vary from one embodiment to the next, and the claimed invention is not intended to be limited to any particular configuration scheme of any kind, as will be appreciated.

As can further be seen from FIG. 3D, in some cases, the UI provided by display 210 optionally may display additional UI features, such as a back button 218 (e.g., to allow a user to go back to a previous menu/sub-menu). However, in some instances, returning to a previous menu/sub-menu additionally or alternatively may be achieved using one or more of the control features 222, 224, 226, etc., previously discussed. Also, in some cases, a save button 219 (e.g., to save user selections/inputs or other user data to device 200, stylus 100, and/or cloud 300) may be provided, and in some such instances, saving additionally or alternatively may be achieved using one or more of the control features 222, 224, 226, etc. In some still other cases, saving of user selections/inputs may be done automatically without further confirmation by a user. Other suitable optional UI features will depend on a given application and will be apparent in light of this disclosure.

In some embodiments, device 200 may include componentry which allows it to be powered, in part or in whole, by a standard or custom battery and/or integrated capacitive circuitry. When applicable, charging/recharging of the power source of device 200 may be provided using any suitable energy source (e.g., electrical energy, solar energy, mechanical energy, etc.), as desired for a given target application or end-use. Other suitable power supply componentry and capabilities for device 200 will depend on a given application and will be apparent in light of this disclosure.

As previously noted, it may be desirable in some instances to provide the user with the ability to locate device 200 relative to an associated stylus 100 and/or vice versa. To that end, and in accordance with an embodiment, device 200 optionally may include locating/tracking componentry. As will be appreciated in light of this disclosure, such locator/tracker componentry may be configured and may function in much the same way as discussed above with reference to stylus 100, in some embodiments. Numerous suitable configurations will be apparent in light of this disclosure.

In some embodiments, device 200 may include audio componentry, for example, to aid in recording and/or playback of audio data. In some cases, device 200 may include a speaker or other audio output device, for example, to play audio data received from a paired stylus 100, cloud 300, or other data source. In some instances, device 200 may include a microphone or other audio input device, for example, to record audio data (e.g. from the user or other source near device 200). Numerous configurations will be apparent in light of this disclosure.

Methodology

As previously noted, and in accordance with one or more embodiments, a stylus 100 configured as described herein can include communications componentry for wireless communication with device 200 and/or cloud 300 and can include on-board storage componentry which permits stylus 100 to store any of a wide variety of user data. In some embodiments, stylus 100 can store access data, such as a user identification (UID), password, or other credentials, and wirelessly communicate such access data to device 200 and/or cloud 300, thus allowing stylus 100 to pair with device 200 and/or access cloud 300, directly or indirectly. In some embodiments, stylus 100 can store user profile data (e.g., device settings, preferences) and wirelessly communicate such profile data to device 200 and/or cloud 300 for online, social media, or other network use.

In some embodiments, stylus 100 can store preferred device settings and wirelessly communicate such data to a given paired device 200 to alter the performance of that device 200; for instance, User A's Device A can adopt settings, in part or in whole, which are stored as part of the user data on Stylus B, and thus Device A can adapt itself to meet the preferred user experience of User B based on those stored settings. In some embodiments, stylus 100 can store user-specific content, such as image files, audio files, video files, social media notifications, text messages, contact information, voicemails, e-mails, and alerts/reminders for scheduled events. In any such cases, stylus 100 may be configured, in accordance with one or more embodiments, to permit access, review, alteration, saving, and/or reversion of user data stored on stylus 100 and/or in cloud 300, as desired for a given target application or end-use. Other user data which may be stored on and wirelessly communicated by stylus 100 will depend on a given application as will be appreciated.

In accordance with one or more embodiments, stylus 100 can be configured to allow a user to access or otherwise utilize his or her user data, which is stored locally on stylus 100 (and, in some cases, remotely in cloud 300), using a device 200 regardless of whether that device 200 is the user's personal or otherwise default/home device. Access/use of user data may be made, for example, upon user input/command using a control feature 118 of stylus 100, and/or automatically upon establishing a wireless communication link between stylus 100 and device 200 and verification of the UID or other credentials associated with stylus 100. Numerous configurations will be apparent in light of this disclosure.

In accordance with an embodiment, stylus 100 can be configured to perform or otherwise authorize a refresh or other syncing of user data stored, for example, on stylus 100, on device 200, and/or in cloud 300. In some cases, stylus 100 may perform a data refresh on a push-style basis; that is, active transfer of data to stylus 100 from device 200 and/or cloud 300 may occur when such data arrives or is otherwise made present thereat. As will be appreciated, active transfer of data from stylus 100 to device 200 and/or cloud 300 similarly may be provided, as desired. In some other cases, stylus 100 may perform a data refresh for system 1000 upon user input/command via a control feature 118 of stylus 100. In some still other cases, stylus 100 periodically may perform a data refresh, for instance, based on a user-defined schedule or a given time interval. Other suitable data refresh capabilities of stylus 100 (and thus of system 1000) will depend on a given application and will be apparent in light of this disclosure.

Figure 4A:
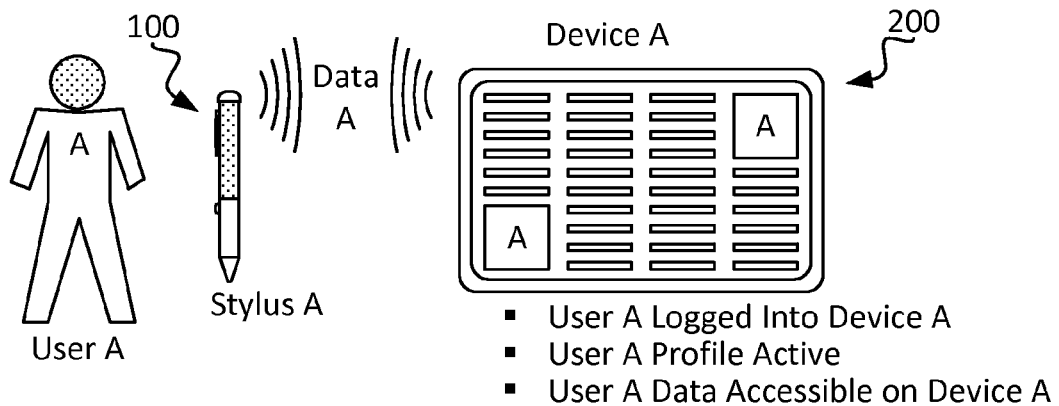
FIGS. 4A-4C illustrate an example process of using multiple styluses to interact with a single electronic device, in accordance with an embodiment of the present invention.
Figure 4B:
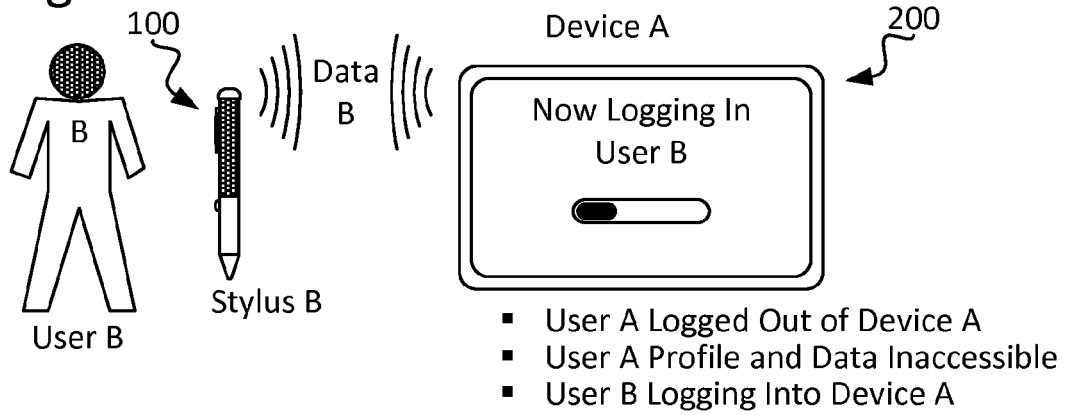
Figure 4C:
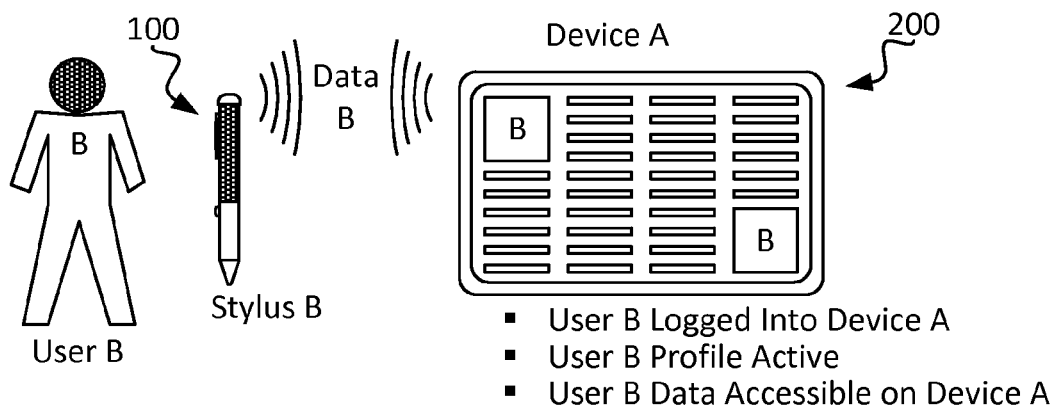

FIGS. 4A-4C illustrate an example process of using multiple styluses 100 to interact with a single electronic device 200, in accordance with an embodiment of the present invention. As can be seen in FIG. 4A, the process begins with User A utilizing his Stylus A with his paired Device A. User A is logged into Device A (e.g., User A's access data has been verified; User A's profile is active on Device A), and thus User A can access and manipulate his user data on Device A. Turning now to FIG. 4B, the process continues with a different User B utilizing her stylus B with User A's Device A. User A is logged out of Device A, making User A's profile inactive and User A's data inaccessible on Device A. As shown in FIG. 4C, once User B is logged into Device A (e.g., User B's access data has been verified; User B's profile is active on Device A), User B can access her user data on Device A. Thus, and in accordance with an embodiment, multiple users (e.g., User A and User B) with their respective styluses 100 (e.g., Stylus A and Stylus B) can utilize a single device 200 (e.g., Device A) to access their respective user data sets (e.g. stored on their respective styluses 100 and/or in cloud 300) independently of whether device 200 is a given user's personal or otherwise default/home device 200. As will be appreciated in light of this disclosure, and in accordance with another embodiment, any number of users, each independently having a stylus 100, can make use of a single electronic computing device 200 to access his or her user data, as variously described herein, to the exclusion of other users of the same device 200.

Numerous use-case scenarios and system configurations will be apparent in light of this disclosure. For instance, if the computing device is a multi-user supported device where each user has an account set-up on the device (with corresponding login credentials, profile, content, etc., for each user), the stylus-based auto-access mode can be configured to switch from one user to the next. In some such embodiments, for instance, User A's data can be stored directly on the device but will be inaccessible to User B (or any other users, unless authorization is given by User A). On the other hand, if the computing device is not a multi-user supported device and device A belongs to User A, then the stylus-based auto-access mode can be configured to log User A out of his/her data and clear out any local history or cache but keeping the data accessible to User A and hidden from User B (and any other unauthorized users), and to login User B with his/her data in a transient state such as a guest mode or otherwise restricted access mode such that User B cannot access User A's data. In some such embodiments, any changes to data, settings, or a profile made by User B while on Device A can be saved to cloud repository (or any suitable remote storage facility accessible to User B via a network with which Device A is communicatively coupled), but not saved locally on the device. In this sense, whether the computing device acts as a portal to remote storage via a network or allows for local storage can be determined based on ownership of the device (e.g., those that have user accounts on the device can store locally, while visitors can only use the device in visitor mode that provides access to remotely stored data).

FIG. 5 is a flow diagram illustrating an example method of stylus-based auto-access to a computing device 200 by multiple users, in accordance with an embodiment of the present invention. As will be appreciated, the auto-access mode may be executed, for example, by the UI of device 200. The process may begin as in block 510 with Device A detecting Stylus A of User A. The process may continue as in block 520 with User A being logged into Device A, thus making User A's user data accessible on Device A. Stylus A may be communicatively coupled with Device A using any of the various wireless and/or wired communication techniques previously discussed.

In some cases, Device A may detect a second stylus (Stylus B) of a different user (User B), as in block 530. In some such cases, the process may continue as in block 540 with User A being logged out of Device A, which makes User A's user data inaccessible on Device A. Thereafter, the process may continue as in block 550 with User B being logged into Device A, thus making User B's user data accessible on Device A. As will be appreciated, Stylus B may be communicatively coupled with Device A using any of the same wireless and/or wired means noted above in the context of Stylus A. As will be further appreciated, and in accordance with another embodiment, any number of subsequent users (e.g., a third User C, a fourth User D, etc.) may make use, in like fashion, of the shared Device A.

Figure 6:
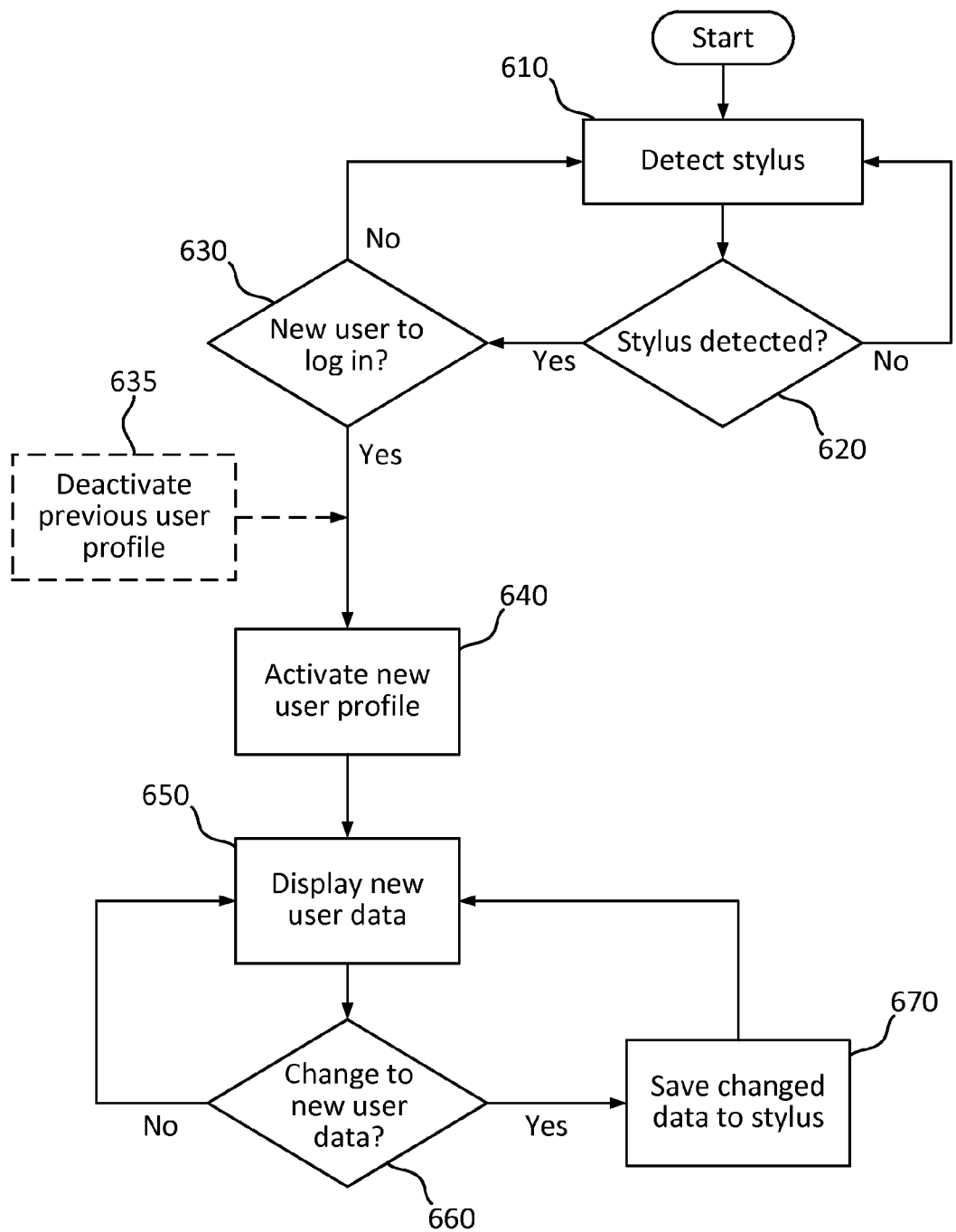
FIG. 6 is a flow diagram illustrating an example method of providing stylus-based auto-access to a computing device to one or more users, in accordance with an embodiment of the present invention.

FIG. 6 is a flow diagram illustrating an example method of providing stylus-based auto-access to a computing device 200 to one or more users, in accordance with an embodiment of the present invention. As will be appreciated, the access mode may be executed, for example, by the UI of device 200. The process may begin as in block 610 with detecting whether a stylus 100 is within sufficient range to wirelessly communicate with device 200 (or otherwise is communicatively coupled with device 200 via a wired connection). As will be appreciated, this detection may occur via the stylus hovering over or actually touching the stylus detection surface of the computing device. In some such cases, for example, the stylus detection surface includes a network of antenna coils that create a magnetic field, which powers a resonant circuit within the stylus. In such an example, the stylus may be powered by energy from the antenna coils in the device and the stylus may return the magnetic signal back to the device, thus communicating the stylus' location above the device, angle of inclination, speed of movement, and control feature activation (e.g., pressure-sensitive squeeze/tap action). In one particular example, the stylus sensor grid of the computing device includes more than one set of antenna coils. In such an example embodiment, one set of antenna coils may be used to merely detect the presence of a touching or hovering or otherwise sufficiently proximate stylus, while another set of coils determines with more precision the stylus' location above the device and can track the stylus' movements. In some embodiments, if there are multiple styluses hovered over the computing device, then the auto-access mode may be configured to prompt the user(s) to pick which user account should be used. Once a selection has been made, the credential can be verified to ensure that a legitimate selection has been made (thus, a User B will not be able to select User A's profiled to gain access to User A's data, unless User B has User A's stylus). Numerous variations will be apparent in light of this disclosure.

As in block 620, if no stylus 100 is detected by device 200, then additional attempts at detecting a stylus 100 may be made as in block 610. If instead a stylus 100 is detected by device 200, then the process may continue as in block 630 with determining whether the newly detected user is to be logged into the device 200. If the user does not wish to log in (or is otherwise prevented/restricted from logging in), then the process may return to block 610, and additional stylus detection attempts may be made. If instead the user is to be logged into the device 200, then the process may continue as in block 640 with granting access and activating the new user's profile on device 200. It should be noted that, in some instances, a previous user profile may be active on device 200, and thus before activation of the new user profile (as in block 640), the previous user profile is deactivated (revoking or otherwise restricting that previous user's access), as in optional block 635. In some instances, this may help to ensure the security and privacy of the previous user's data, as well as prevent the previous user from accessing the new user's data that is to be made available on device 200.

Upon activation of the new user profile (as in block 640), the process may continue as in block 650 with displaying the new user data on device 200. As previously discussed, the user may utilize, for example, a touch-sensitive user interface (UI) of device 200 to review and/or alter his or her data, as desired. Thereafter, the process may continue as in block 660 with making a determination as to whether a change to the user's data is to be made (or has been made). If no changes are noted, device 200 may continue to display the user's data for user access (as in block 650). If instead a change to the user's data is noted, then the process may continue as in block 670 with saving the changed data to stylus 100 (recall that stylus 100 may be configured to locally store a user's data, which can include access data, user profile, and/or content, as previously discussed).

Numerous variations on the processes of FIGS. 4A-C, 5, and/or 6 will be apparent in light of this disclosure. As will be appreciated, and in accordance with an embodiment, each of the functional aspects and/or decision points shown in FIGS. 5 and 6 can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have input/output capacity for soliciting input from a user and providing responses to user requests), and/or hardware (e.g., gate level logic, field programmable gate array, purpose-built silicon, etc.).

Further Considerations

In accordance with one or more embodiments of the present invention, any of the various features/capabilities of stylus 100 and/or device 200 can be customized to meet a given user's preferences. For instance, in some cases, a user can customize the settings: for communication between stylus 100, device 200, and/or cloud 300; for allowing other styluses 100 to pair with device 200; and/or for accessing user data stored on a given stylus 100. In some instances, a user can customize settings pertaining to data refreshing (e.g., push; on user command; periodic; scheduled), as previously discussed. In some cases, a user may customize the settings of the user interface (UI) to be provided by device 200. Furthermore, in some cases, a user may customize power usage settings for stylus 100 and/or device 200 (e.g., performance priority; energy-saving priority; or other power usage profile). Still further, in some instances, a user may customize the security settings (discussed below) for stylus 100 and/or device 200, such as the elapsed time before lock-out, password requirements, and/or data erasure upon repeated log-in failure. Other user preferences and device settings which may be customized for a given stylus 100 and/or device 200 will depend on a given application and will be apparent in light of this disclosure.

As previously noted, in some embodiments, user data may be stored on stylus 100, and device 200 may retrieve or otherwise utilize a user profile from that data. In some cases, the user profile may be accessed when instructed; to that end, a given control feature 118 of stylus 100 may be assigned or otherwise configured, for example, to activate, change, and/or deactivate a given user profile on device 200. In some instances, a given control feature 118 may be configured, for example, to alter individual settings of a user profile, as desired for a given target application or end-use. Other user profile capabilities of a stylus 100 will depend on a given application and will be apparent in light of this disclosure.

In some instances, it may be desirable to provide stylus 100 with one or more security features, for example, to aid in preventing misuse thereof and/or of device 200. To that end, stylus 100 and/or device 200 may be configured, in some embodiments, to alert the user that a different user (e.g., a different stylus 100) is attempting to pair with device 200 while in use by the current user. In some such cases, device 200 may provide to the user a UI option box/dialogue for accepting and/or rejecting the attempted access by the new user/stylus. In another example case, the auto-access mode may be configured to deny user access to the device 200 in response to a deficiency associated with the user access data stored in or otherwise missing from the stylus-based storage (such as in the case of the wrong credentials or no credentials being provided). Other suitable techniques for securing a stylus 100 and/or device 200 to prevent or otherwise reduce misuse thereof will depend on a given application and will be apparent in light of this disclosure.

In some embodiments, stylus 100 may be configured to receive updates to software, firmware, etc. In some cases, updating may be achieved through a hardwired interface/port (e.g., USB, Ethernet, FireWire, disc drive, card drive) of a given stylus 100. However, the claimed invention is not so limited, as in some instances, updating may be achieved wirelessly, for example, using any of the various wireless communications techniques discussed above with reference to stylus 100 and device 200. In some cases, updating of stylus 100 may occur automatically, such as when stylus 100 is engaged (e.g., docked) or otherwise sufficiently proximate to associated device 200. In some other cases, updating may occur upon user input/command. In some instances, stylus 100 may be updated using data received by device 200, while in some other instances stylus 100 may be updated from a different wireless source (e.g. network/cloud 300). Other suitable techniques for updating stylus 100 will depend on a given application and will be apparent in light of this disclosure.

Numerous variations and embodiments will be apparent in light of this disclosure. One example embodiment of the present invention provides a system including an electronic computing device having a touch-sensitive surface for receiving user input via a stylus, and a user interface executable on the device and including an auto-access mode configured to allow user access to the device using user access data received from a stylus-based storage. In some cases, the user access data includes login credentials for accessing the device. In some cases, the user access data includes a user profile including at least one preferred setting for the device. In some cases, the system includes the stylus including the stylus-based storage, wherein the storage is configured to store user content. In some such cases, at least one of the stylus and/or the computing device is configured to communicatively couple with a network, and the auto-access mode is configured to allow for data transfer over the network. In some cases, the user access data allows for access of user data stored in a cloud-based repository using the electronic device. In some cases, the touch-sensitive surface of the electronic device comprises a touchscreen display. In some cases, the auto-access mode is configured to deny user access to the device in response to a deficiency associated with the user access data. In some cases, the auto-access mode is configured to allow user access to the device in response to any stylus that includes user access data including at least one of login credentials and/or one or more device settings. In some cases, the auto-access mode is configured to prompt a current user of the device that a second user is attempting access the device, and to give the current user an opportunity to accept or deny the second user access attempt. In some cases, the auto-access mode is configured to logout a current user of the device when a second user attempts to access the device with a second stylus having user access data stored therein.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to detect (via an electronic device having a touch-sensitive display) a first stylus, access a first user access data set stored on the first stylus, and provide access to the device using the first user access data set. In some cases, the user access data includes at least one of login credentials for accessing the device and/or a user profile including at least one preferred setting for the device. In some cases, the process is configured to display content of the first user on the touch-sensitive display of the electronic device. In some cases, the first user access data set allows for access of user data stored in a cloud-based repository using the electronic device. In some cases, the auto-access mode is configured to deny user access to the device in response to a deficiency associated with the user access data. In some cases, the auto-access mode is configured to allow user access to the device in response to any stylus that includes user access data including at least one of login credentials and/or one or more device settings. In some cases, the auto-access mode is configured to prompt the first user of the device that a second user is attempting access the device, and to give the first user an opportunity to accept or deny the second user access attempt. In some cases, the auto-access mode is configured to logout the first user of the device when a second user attempts to access the device with a second stylus having a second user access data set stored therein.

Another example embodiment of the present invention provides a system including an electronic computing device having a touch-sensitive surface, a stylus configured to interact with the touch-sensitive surface and to wirelessly communicate with the electronic device (the stylus including a storage module having user access data stored therein), and a user interface executable on the device and including an auto-access mode configured to allow user access to the device using the user access data from the stylus.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
    an electronic computing device comprising a touch-sensitive surface configured to receive input via a stylus; and
    a user interface executable on the electronic computing device and comprising an auto-access mode configured to:
        allow a first user access to the electronic computing device using first user access data received from a stylus-based storage of a first stylus, wherein the first user access data includes a first user profile including at least one first user preferred setting for the electronic computing device; and
        logout the first user of the electronic computing device when a second user attempts to access the electronic computing device using second user access data received from a stylus-based storage of a second stylus different from the first stylus, wherein the second user access data includes a second user profile including at least one second user preferred setting for the electronic computing device;
        wherein content and the first user profile associated with the first user of the electronic computing device are inaccessible to the second user of the electronic computing device, and content and the second user profile associated with the second user of the electronic computing device are inaccessible to the first user of the electronic computing device.

2. The system of claim 1, wherein at least one of the first and second user access data includes login credentials for accessing the electronic computing device.

3. The system of claim 1 further comprising at least one of the first and second styluses including the stylus-based storage, wherein the stylus-based storage is further configured to store user content.

4. The system of claim 3, wherein:
at least one of the first stylus, second stylus, and/or the electronic computing device is configured to communicatively couple with a network; and
the auto-access mode is further configured to allow for data transfer over the network.

5. The system of claim 1, wherein at least one of the first and second user access data further allows for access, via the electronic computing device, of user data stored in a cloud-based repository.

6. The system of claim 1, wherein the touch-sensitive surface of the electronic computing device comprises a touchscreen display.

7. The system of claim 1, wherein the auto-access mode is further configured to deny access to the electronic computing device in response to a deficiency associated with at least one of the first and second user access data.

8. The system of claim 1, wherein the auto-access mode is further configured to allow access to the electronic computing device in response to user access data received from any stylus-based storage, the user access data including at least one of login credentials and one or more device settings.

9. The system of claim 1, wherein the auto-access mode is further configured to cause display of a prompt on a display of the electronic computing device that another user is attempting to access the electronic computing device, and to provide opportunity to accept or deny the access attempt.

10. A non-transitory computer program product comprising a plurality of instructions encoded thereon that, when executed by one or more processors, cause a process to be carried out, the process comprising:
detect, via an electronic device comprising a touch-sensitive display, a first stylus;
access a first user access data set stored on the first stylus;
provide access to the electronic device using the first user access data set, wherein the first user access data set includes a first user profile including at least one first user preferred setting for the electronic device; and
logout the first user of the electronic device when a second user attempts to access the electronic device using a second user access data set stored on a second stylus different from the first stylus, wherein the second user access data set includes a second user profile including at least one second user preferred setting for the electronic device;
wherein content and the first user profile associated with the first user of the electronic device are inaccessible to the second user of the electronic device, and content and the second user profile associated with the second user of the electronic device are inaccessible to the first user of the electronic device.

11. The non-transitory computer program product of claim 10, wherein the first user access data set further includes login credentials for accessing the electronic device.

12. The non-transitory computer program product of claim 10, the process further comprising:
display content of at least one of the first and second users on the touch-sensitive display of the electronic device.

13. The non-transitory computer program product of claim 10, wherein the first user access data set further allows for access, via the electronic device, of user data stored in a cloud-based repository.

14. The non-transitory computer program product of claim 10, wherein the process further comprises:
deny access to the electronic device in response to a deficiency associated with at least one of the first and second user access data sets.

15. The non-transitory computer program product of claim 10, wherein the process further comprises:
allow access to the electronic device in response to any stylus having stored thereon a user access data set including at least one of login credentials and one or more device settings.

16. The non-transitory computer program product of claim 10, wherein the process further comprises:
cause display of a prompt on the touch-sensitive display of the electronic device that another user is attempting to access the electronic device, and provide opportunity to accept or deny the access attempt.

17. A system comprising:
an electronic computing device comprising a touch-sensitive surface;
a first stylus configured to interact with the touch-sensitive surface and to wirelessly communicate with the electronic computing device, the first stylus comprising a storage module configured to store first user access data therein; and
a user interface executable on the electronic computing device and comprising an auto-access mode configured to:
allow a first user access to the electronic computing device using the first user access data, wherein the first user access data includes a first user profile including at least one first user preferred setting for the electronic computing device; and
logout the first user of the electronic computing device when a second user attempts to access the electronic computing device using second user access data received from a stylus-based storage of a second stylus different from the first stylus, wherein the second user access data includes a second user profile including at least one second user preferred setting for the electronic computing device;
wherein content and the first user profile associated with the first user of the electronic computing device are inaccessible to the second user of the electronic computing device, and content and the second user profile associated with the second user of the electronic computing device are inaccessible to the first user of the electronic computing device.

* * * * *